Patented Feb. 15, 1944

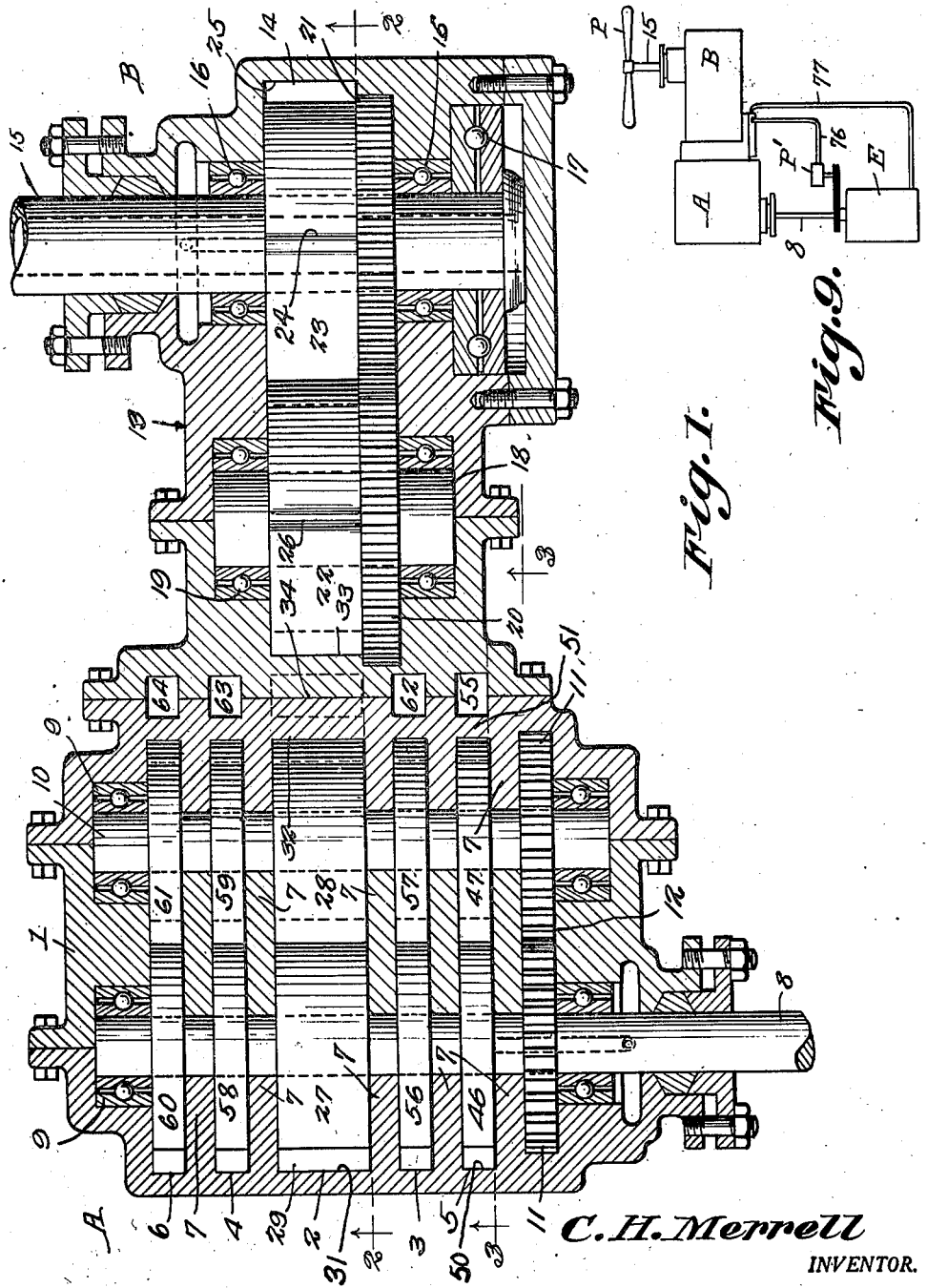

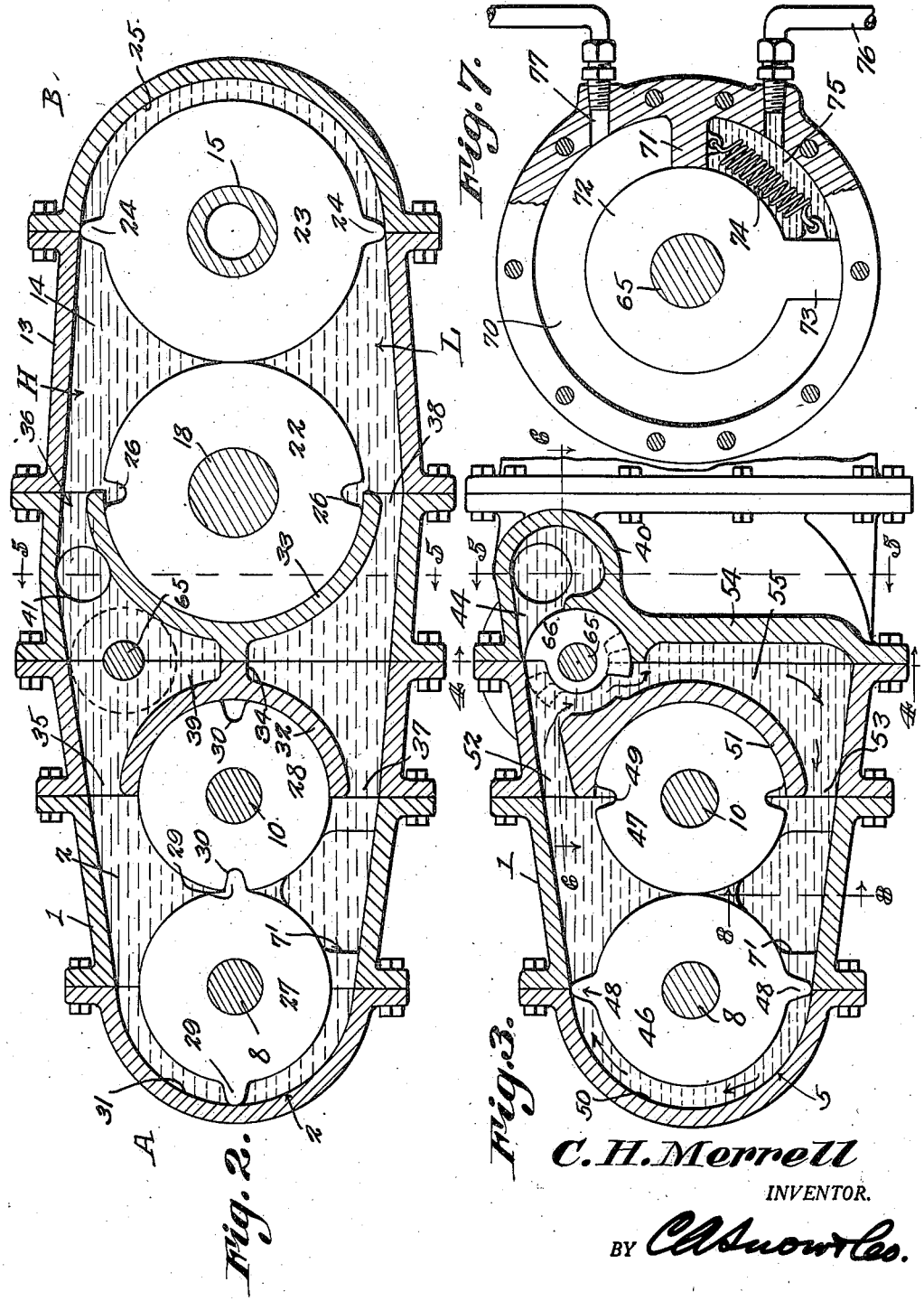

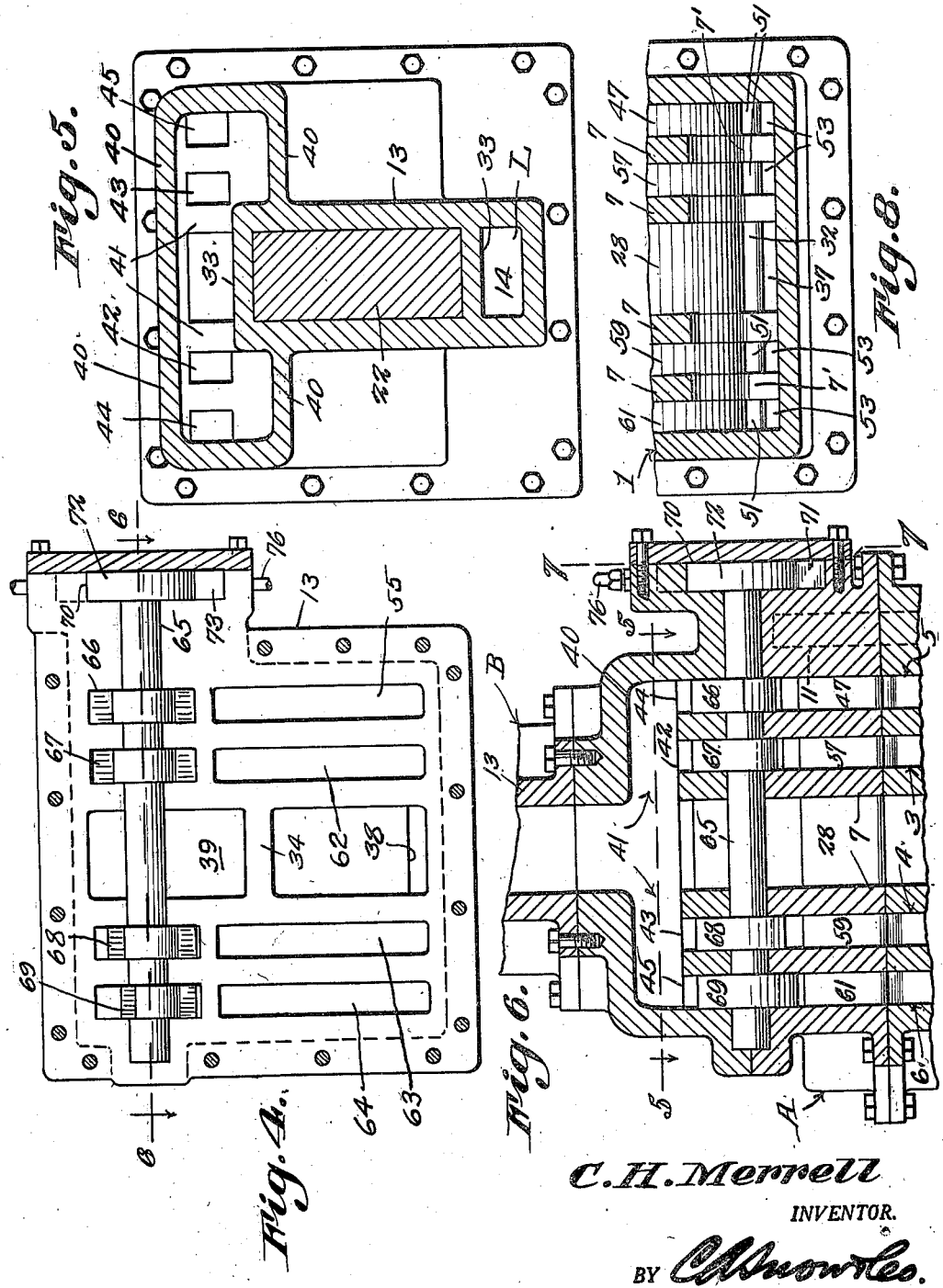

2,342,002

UNITED STATES PATENT OFFICE 2,342,002

HYDRAULIC TRANSMISSION

Cleburne H. Merrell, Beaumont, Tex.

Application July 18, 1941, Serial No. 403,065

10 Claims. (Cl. 60—19)

This invention relates to a hydraulic transmission and while it is useful in the propulsion of trucks and other vehicles as well as for the transmission of power in motor boats, etc., its primary advantage is found in its application to aircraft.

It is a fact well known to those experienced in the mechanics of aviation that as an aircraft ascends to high altitudes the resistance to the rotation of the propellers is reduced. This has resulted either in increased engine speed to effect more rapid propeller rotation or else necessitated the employment of means for changing the pitch of the propellers. Increase of engine speeds must be kept under certain limits to prevent injury and even when adjustable propeller blades are used, the engine must be watched to avoid objectionable racing of the engine when at high altitudes.

It has been practically impossible to maintain the engine at approximately a constant predetermined R. P. M. of maximum efficiency at all altitudes without loss of flying speed.

An object of the present invention is to utilize a fluid transmission which will increase its driving force in proportion to the increase in altitude without however changing the speed of the engine to any objectionable extent, so that while the engine is operating substantially at a predetermined speed of maximum efficiency, the force exerted thereby through the transmission to the propeller, will be increased as the aircraft ascends. Consequently the speed of rotation of the propeller is increased at a ratio sufficient to maintain maximum flying speed at all altitudes, and this speed can go far beyond that which is now possible.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawings the preferred form of the invention has been shown.

In said drawings

Figure 1 is a horizontal section through the transmission.

Figure 2 is a section on line 2—2, Figure 1.

Figure 3 is a section on line 3—3, Figure 1.

Figure 4 is a section on line 4—4, Figure 3.

Figure 5 is a section on line 5—5, in Figures 2, 3 and 6.

Figure 6 is a section on line 6—6, Figures 3 and 4.

Figure 7 is a section on line 7—7, Figure 6, a portion being broken away.

Figure 8 is a section on line 8—8, Figure 3.

Figure 9 is a diagram showing the transmission assembled with the engine and propeller of an aircraft.

The transmission includes a driving unit A and a driven unit B. The driving unit includes a housing 1 formed preferably of sections bolted together or otherwise joined which, when assembled, provide a main chamber 2 and supplemental chambers. Any desired number of supplemental chambers can be employed and in the present instance four of them have been shown at 3, 4, 5 and 6. These chambers are separated by partitions 7 integral with the housing 1 in the structure shown and providing bearings for a drive shaft 8 receiving motion from an engine E. Bottom openings 7' are formed in all of the partitions so that transmission fluid in the chambers can flow from one to the other at the bottom thereof. Bearings 9 are provided in opposed ends of housing 1 for the shaft 8 and also for the ends of a countershaft 10 located within housing 1 and parallel with shaft 8. Gears 11 are contained within the housing and serve to transmit motion from one shaft to the other. Thus the two shafts will be driven positively in opposite directions respectively and at the same speed. The gears 11 are located in a chamber 12 formed in housing 1 and out of communication with the other chambers.

The housing 13 of the unit B is likewise formed preferably of sections suitably connected and has a central chamber 14 alined with chamber 2. Extending across this chamber and journaled in the housing 14 is the shaft 15 of a propeller P or other driven element, this shaft being centered by suitable anti-friction bearings 16 and also being provided with a thrust bearing 17.

A counter-shaft 18 is journaled at its ends in opposed portions of the housing 13 and is parallel with shaft 15. This counter-shaft, which is preferably provided with bearings 19, has a gear 20 in constant mesh with another gear 21 on shaft 15. Thus the two gears are caused to rotate simultaneously in opposite directions respectively and at the same speed.

A pair of rotors 22 and 23 is located in the chamber 14, these rotors being secured to the shafts 18 and 15 respectively and being in constant contact at their peripheries. Rotor 23, which is carried by shaft 15, has opposed outwardly extended fins 24 which are so proportioned as to have a wiping contact with the arcuate outer end wall 25 of chamber 14. Rotor 22 has opposed peripheral recesses 26 so positioned as to receive the fins 24 as they arrive successively at the line of contact between the two rotors. The rotors and the gears associated therewith extend throughout the width of the chamber 14 and have tight working fits against the opposed walls of the chamber.

Secured to the shafts 8 and 10 of the unit A are main driving circulators or rotors 27 and 28 which contact at their peripheries. One of these rotors has oppositely disposed fins 29 on its periphery while the other rotor has oppositely disposed recesses 30 in its periphery. These fins and recesses are so located that the fins will enter the respective recesses as they move past the line of contact between the rotors. The fins are also so positioned and proportioned as to have a wiping contact with the arcuate end wall 31 of chamber 2.

An arcuate partition 32 is fitted against that portion of the periphery of rotor 28 which is remote from rotor 27 and another arcuate partition 33 is fitted snugly against that portion of the periphery of rotor 22 which is remote from rotor 23. The two partitions are joined by a web 34 and are spaced at their ends from the adjacent walls of the housings 1 and 13 so as to provide upper ports 35 and 36 and lower ports 37 and 38. Thus the two chambers 2 and 14 are in constant communication through the ports which are coextensive in width with the rotors 28 and 22, and the several rotors cooperate to divide the communicating chambers 2 and 14 into an upper or high pressure side H and a lower or low pressure side L, the latter having the openings 7'.

A connecting chamber 39 is located between the ports 35 and 36 above web 34 and between partitions 32 and 33. This connecting chamber, which is in communication solely with the upper or high side H of the transmission chamber, has a header 40 opening into each side thereof as indicated at 41 and this header is in communication, through ports 42, 43, 44 and 45 with the upper portions of the chambers 3, 4, 5 and 6 respectively.

In chamber 5 are located contacting supplemental circulators or rotors 46 and 47 secured to the shafts 8 and 10 respectively so as to rotate therewith. Rotor 46 is provided with oppositely extended fins 48 at its periphery while rotor 47 is provided with opposed peripheral grooves 49 so located as to receive the fins 48 as they pass the line of contact between the rotors. Fins 48 are also so proportioned as to have a wiping contact with the arcuate wall 50 of chamber 5. An arcuate partition 51 embraces the rotor 47 and extends from one side to the other of chamber 5, this partition being spaced at the top from the top wall of housing 1 to provide a port 52 adapted to communicate with port 44 while another port 53 is provided between the bottom end of partition 51 and the bottom wall of the housing 1. Partition 51 is spaced from the adjacent end wall 54 of the housing so as to provide a by-pass 55 extending from port 52 to port 53.

In chamber 3 there is provided another pair of supplemental circulators or rotors 56 and 57 located and constructed as described with reference to the rotors 46 and 47 and additional pairs of supplemental circulators or rotors 58 and 59, and 60 and 61 are also similarly mounted and located in the chambers 4 and 6 respectively, there being, in every case, a by-pass connecting the upper and lower portion of the chamber. The by-pass of chamber 3 has been indicated at 62 while the by-passes of chambers 4 and 6 have been indicated at 63 and 64 respectively. Each chamber has its high pressure side above its by-pass.

Extending transversely through the connecting chamber 39 and also through the upper portions of the by-passes is a valve shaft 65 on which are mounted segmental valves 66, 67, 68 and 69. Each valve is so proportioned that, when it is in one extreme position, it closes communication between the manifold 40 and the port 52 so that fluid used in the transmission, is thus free to circulate in the chamber controlled by the valve. For example, and as shown in Figure 3, when the valve 66 is in its normal position fluid contained within the chamber 5 can be circulated by the revolving rotors 46 and 47 so as to flow through ports 52 downwardly past valve 66 into by-pass 55 and thence through port 53. The direction of flow has been indicated by arrows in Figure 3. Valve 66, however, when moved one point to the right in Figure 3 or in a clockwise direction, will shut off communication between port 52 and the by-pass 55 and establish communication between port 52 and port 44. The several valves 66, 67, 68 and 69 are of the same construction but are disposed in stepped relation so that when valve 66 is positioned as shown in Figure 3, all the other valves, as indicated by broken lines in said figure, are likewise positioned to maintain communication between ports 52 of the respective chambers 3, 4 and 6 and their by-passes 62, 63 and 64 respectively. When valve 66 is moved one point to close the by-pass 55 and open communication between port 52 and the header 40, the other valves will still maintain communication between their ports 52 and the by-passes thereunder. When the valve 66 is moved another point, however, it will not only continue to maintain communication between port 52 and header 40 but it will also cause valve 69 to close by-pass 64 and establish communication between chamber 6 and the header 40. When the valves are moved clockwise another point, valve 68 will cut off the by-pass adjacent thereto and establish communication between chamber 3 and the header and when the valve is given another partial rotation in a clockwise direction, valve 67 will be brought into action to shut off by-pass 63 and establish communication between chamber 4 and the header 40. During these successive operations the valves which had previously been moved to establish communication with the header, still maintain their by-passes closed. When the valves are rotated in the opposite or a counter-clockwise direction, the foregoing action is reversed, the by-passes being successively opened as they are cut off from communication with the header. Under normal operating conditions all of the by-passes are open and only chamber 2 is in communication with chamber 14, at its high pressure side.

The shaft 65 is extended into a pressure chamber 70 containing a radially disposed abutment 71 which is fixed within the housing. To that portion of shaft 65 in chamber 70 is secured a rotor 72 which is fitted snugly against abutment 71 and is provided with a radial head 73 having wiping contact with the annular inner surface of the chamber 70. Suitable resilient means, such as a spring 74, can be located in the chamber 70 for the purpose of resisting movement of the head 73 away from the abutment 71, this spring being shown connected at one end to the abutment and at its other end to the head 73. A pressure-receiving chamber 75 is formed between the abutment 71 and the head 73 and is connected by a pipe 76 to the pump P' of the engine E. That portion of the chamber 70 at the other side of the head 73 has an outlet port 77 for the free passage of fluid into or out of chamber 70.

As heretofore intimated, the units A and B are to be filled with a fluid suitable for transmission purposes. When the engine E is started shaft 8 will drive the rotors 27 and 28 so that the fluid contained in chamber 2 will thus be circulated through chamber 39 and ports 35 and 36 to chamber 14. This will result in operating the rotors 22 and 23 so that the shaft 15 will be driven at a speed sufficient to enable the craft to take off.

The resistance offered by the spring 74 or other means used for that purpose, is such that when the engine E is operating at its most efficient speed, the head 73 will be held in a predetermined position where all of the valves on shaft 65 are maintaining all of the by-passes open so that the rotors in the chambers 3, 4, 5 and 6, will merely set up an unhindered circulation of fluid within their respective chambers.

As the aircraft reaches a higher altitude where the propeller encounters less atmospheric resistance, the engine will tend to speed up. This will result in supplying fluid under increased pressure from the pump to the chamber 75 with the result that head 73 will be moved away from the normal position held thereby during the operation of the engine and this movement will cause one of the valves to partly or entirely cut off the by-pass controlled thereby. When this is done communication between the header 40 and the chamber controlled by the valve will be partly or entirely open with the result that the fluid being forced into the chamber 14 by the rotors 27 and 28 will be supplemented by an additional amount of fluid directed into the header instead of circulating through the by-pass which has been partly or entirely closed. This added fluid will effect an increased rotation of the shaft 15 which will be above that of the shafts 8 and 10 and, consequently, the speed of rotation of the propeller will be increased without materially increasing the speed of the engine. The fluid additionally pumped by the supplemental rotors 46, 47, etc., into chamber 14 is returned to said rotors through ports 38 and 37 and thence through the openings 7'. (See Figs. 2 and 8.) When a still higher altitude is attained and the propeller encounters still less resistance from the atmosphere, the engine will speed up slightly so that added pressure of fluid will be directed into the chamber 75 and the head 73 will be advanced to another position. This will result in directing into the header 40 another stream of fluid propelled by a second set of rotors in the unit A and the fluid thus added to that already circulating within chamber 14 will produce a still greater speed of shaft 15. Thus the rotation of shaft 15 can be built up as the altitude increases and, consequently, the speed of the aircraft can be maintained at high altitudes or even increased without the necessity of changing the pitch of the propeller blades and reducing their efficiency as propelling mediums.

While the increase in speed of shaft 15 is produced as a result of increase in speed of the engine, it is to be understood that the engine increase in each case can amount to only a few revolutions whereas the resultant increase in the speed of rotation of shaft 15 can be increased by hundreds of revolutions. The variations in the speed of the engine can all be maintained within safe limits so that there will be no danger of the engine racing and being injured when high altitudes are reached.

Obviously as an aircraft descends and the atmosphere becomes more dense, the engine will be slowed down within the limits of speed variations provided and this results in proportionate reduction of pressure within chamber 75 with the result that the valves are brought back step by step to their initial positions and the supplemental fluid streams likewise cut off successively until shaft 15 is driven solely by the stream set up by the rotors 27 and 28.

What is claimed is:

1. In a hydraulic transmission an engine adapted to be operated normally at a selected speed, a housing, a driving fluid therein, a fluid-driven element in the housing, separate fluid circulators in the housing, one of said circulators constituting means for maintaining a flow of fluid at a predetermined volume to the driven element, and means controlled automatically by the engine when its load is reduced and the engine speed starts to increase, for successively establishing flow of fluid between the other circulators and the driven element thereby to increase the volume of the driving fluid, to maintain substantially the normal load on the engine and the selected speed of the engine by increasing the speed of the driven element when resistance to the rotation of said element is reduced.

2. In a hydraulic transmission an engine adapted to be operated constantly substantially at a selected speed, a housing, a driving fluid therein, a fluid-driven element in the housing, separate fluid circulators in the housing, one of said circulators constituting means for maintaining a flow of fluid substantially at a predetermined volume to the driven element, and means controlled automatically by the engine when its load is reduced and the engine speed starts to increase, for successively establishing flow of fluid between the other circulators and the driven element thereby to increase the volume of the driving fluid, to maintain substantially the normal load on the engine and the selected speed of the engine by increasing the speed of the driven element when resistance to the rotation of said element is reduced.

3. In a hydraulic transmission an engine adapted to operate at a selected speed, a housing, a driving fluid therein, a fluid-driven element in the housing, separate fluid circulators in the housing, one of said circulators constituting means for maintaining a flow of fluid substantially at a predetermined volume to the driven element, and means controlled automatically by the engine when its load is reduced and the engine speed starts to increase, for controlling flow of fluid between the driven element and the respective other circulators thereby to vary the volume of the driving fluid, to maintain substantially the normal load on the engine and the selected speed of the engine by increasing the speed of the driven element when resistance to the rotation of said element is reduced.

4. In a hydraulic transmission an engine adapted to operate at a selected speed, a housing, a driving fluid filling the same, a fluid-driven element in the housing, separate main and secondary circulators in the housing, said main circulator constituting means for maintaining a flow of fluid substantially at a predetermined volume to the driven element, and means controlled automatically by the engine when its load is reduced and the engine speed starts to increase, for establishing flow of fluid successively from the secondary circulators to the driven element thereby to increase the volume of the driving fluid, to maintain substantially the normal load on the engine and the selected speed of the engine by increasing the speed of the driven element when resistance to the rotation of said element is reduced.

5. In a hydraulic transmission an engine, a housing, a driving fluid filling the same, a fluid-driven element in the housing, separate main and secondary circulators in the housing, said main circulator constituting means for maintaining a flow of fluid susbtantially at a predetermined volume to the driven element, and means controlled by the speed of the engine for establishing flow of fluid successively from the secondary circulators to the driven element thereby to increase the volume of the driving fluid and the speed of said element.

6. In a hydraulic transmission a housing having a main compartment and supplemental compartments, rotary fluid circulating means in each compartment dividing the compartment into a high pressure side and a low pressure side, the low pressure sides of all of the compartments being in communication, a fluid driven element, a compartment in communication with the high and low pressure sides of the main compartment and housing the driven element, each supplemental compartment having a normally open by-pass between the high and low pressure sides thereof, an engine having a driving connection with the circulators and operable at a speed determined by the load on the driven element, and means controlled by the engine when the load is reduced from normal, for diverting circulating fluid from the supplemental chambers successively to the high pressure side of the driven element thereby to increase the volume of the fluid and the speed of the driven element and to restore the normal load on the engine.

7. In a hydraulic transmission a housing, a transmission fluid therein, main and supplemental fluid circulators in the housing, a fluid-driven element positioned normally for actuation by fluid from the main circulator, an engine for driving the circulators, and means controlled by reductions in the load on the engine for directing fluid from the supplemental circulators to the driven element to increase the volume of the fluid and the speed of the driven element and to increase the load on the engine.

8. In a hydraulic transmission a housing, a transmission fluid therein, main and supplemental fluid circulators in the housing, a fluid-driven element positioned normally for actuation by fluid from the main circulator, an engine for driving the circulators, and means controlled by reductions in the load on the engine for directing fluid from the supplemental circulators to the driven element to increase the volume of the fluid and the speed of the driven element and to increase the load on the engine, said means including an engine-operated pump, valves for controlling the flow of fluid from the respective supplemental circulators to the driven element, and yieldingly restrained means operated by variations in pressure of fluid from the pump for opening and closing the valves in succession.

9. In a hydraulic transmission a housing, a transmission fluid therein, main and supplemental fluid circulators in the housing, a fluid-driven element positioned normally for actuation by fluid from the main circulator, an engine for driving the circulators, and means controlled by reductions in the load on the engine for directing fluid from the supplemental circulators to the driven element to increase the volume of the fluid and the speed of the driven element and to increase the load on the engine, said means including an engine-operated pump, valves for controlling the flow of fluid from the respective supplemental circulators to the driven element, and yieldingly restrained means operated by variations in pressure of fluid from the pump for opening and closing the valves in succession, all of the valves being open when the valves complete their movement in one direction and being closed when they complete their movement in the opposite direction.

10. In a hydraulic transmission a housing, a transmission fluid therein, main and supplemental fluid circulators in the housing, a fluid-driven element positioned normally for actuation by fluid from the main circulator, an engine for driving the circulators, and means controlled by reductions in the load on the engine for directing fluid from the supplemental circulators to the driven element to increase the volume of the fluid and the speed of the driven element and to increase the load on the engine, said means including an engine-operated element for compressing a fluid in proportion to the speed of the engine, a yieldingly restrained movable head for actuation by said fluid under pressure, and valves actuated by the head for controlling the flow of fluid from the respective supplemental circulators to the driven element thereby to increase or reduce the volume of the fluid.

CLEBURNE H. MERRELL.